United States Patent
Peters

(10) Patent No.: US 9,333,581 B2
(45) Date of Patent: May 10, 2016

(54) APPARATUS AND METHOD FOR ENERGY REPLACEMENT IN A WELDING WAVEFORM DURING WELDING

(75) Inventor: Steven R Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 978 days.

(21) Appl. No.: 13/543,545

(22) Filed: Jul. 6, 2012

(65) Prior Publication Data

US 2014/0008342 A1 Jan. 9, 2014

(51) Int. Cl.
*B23K 9/09* (2006.01)
*B23K 9/095* (2006.01)
*B23K 9/10* (2006.01)

(52) U.S. Cl.
CPC ............... *B23K 9/092* (2013.01); *B23K 9/0953* (2013.01); *B23K 9/0956* (2013.01); *B23K 9/1043* (2013.01)

(58) Field of Classification Search
CPC ........ B23K 9/091; B23K 9/092; B23K 9/093; B23K 9/095; B23K 9/0953; B23K 9/10; B23K 9/1006
See application file for complete search history.

(56) References Cited

U.S. PATENT DOCUMENTS

| | | | |
|---|---|---|---|
| 4,046,987 A | 9/1977 | Hashimoto et al. | |
| 4,300,035 A | 11/1981 | Johansson | |
| 4,972,064 A | 11/1990 | Stava | |
| 5,416,299 A | 5/1995 | Tabata et al. | |
| 6,031,203 A | 2/2000 | Suzuki et al. | |
| 6,215,100 B1 | 4/2001 | Stava | |
| 6,794,608 B2 | 9/2004 | Flood et al. | |
| 6,849,828 B2 | 2/2005 | Aigner | |
| 7,173,214 B2 | 2/2007 | Nadzam et al. | |
| 7,304,269 B2 | 12/2007 | Fulmer et al. | |
| 7,767,933 B2 | 8/2010 | Matus et al. | |
| 2005/0016974 A1* | 1/2005 | Myers et al. | 219/130.51 |
| 2009/0152252 A1 | 6/2009 | Kawamoto et al. | |
| 2009/0302014 A1 | 12/2009 | Berg | |
| 2010/0193488 A1 | 8/2010 | Aigner | |
| 2010/0224608 A1 | 9/2010 | Aimi et al. | |
| 2012/0120687 A1* | 5/2012 | Ohsaki et al. | 363/21.09 |

FOREIGN PATENT DOCUMENTS

| | | |
|---|---|---|
| JP | 2006198668 A | 8/2006 |
| JP | 2012095516 A | 5/2012 |

OTHER PUBLICATIONS

International Search Report and Written Opinion for International Application PCT/IB2013/001462 for Applicant Lincoln Global Inc., mailed Jan. 3, 2014, pp. 10.

* cited by examiner

*Primary Examiner* — Brian Jennison
(74) *Attorney, Agent, or Firm* — Perkins Coie LLP

(57) ABSTRACT

A system and method is provided which uses a power supply which receives an input signal and provides an output signal to an electrode, where the output signal generates an arc between the electrode and at least one workpiece, and the output signal has a desired output power profile. The power supply has at least an output power circuit which determines an output power of the output signal, a power differential calculator which determines a difference between the determined output power and the desired output power profile, and a waveform generator which changes a power output of the output signal based on the determined difference between the desired output power profile and the determined output power.

19 Claims, 9 Drawing Sheets

APPARATUS AND METHOD FOR ENERGY REPLACEMENT IN A WELDING WAVEFORM DURING WELDING

INCORPORATION BY REFERENCE

The present invention generally relates to improvement in high speed welding systems of the general type described in each of U.S. Pat. Nos. 4,972,064, 6,215,100, and 7,304,269 the entire disclosures of which are incorporated herein by reference in their entirety.

BACKGROUND OF THE INVENTION

1. Field of the Invention

Devices, systems, and methods consistent with the invention relate to welding, and more specifically to devices, systems and methods for replacing energy in a welding waveform during welding.

2. Description of the Related Art

Various methods of welding are utilized to increase the speed of welding operations. Many of these methods incorporate pulse type welding waveforms which can weld at higher speeds. Further, these pulse type welding waveforms can utilize or implement short circuit clearing routines which are utilized to clear short circuits as they occur during welding. For example, these routines can be used in welding pulse welding applications—where the primary droplet transfer mechanism is across the arc and short circuits occasionally occur—and can be used in short arc and surface tension transfer (STT) welding applications—where the primary droplet transfer mechanism occurs when the electrode touches the puddle. However, even these types of welding applications increase the speed of welding; further enhancements in weld speed and welding power supply stability can be achieved.

BRIEF SUMMARY OF THE INVENTION

An exemplary embodiment of the present invention is a method and system which uses a power supply which receives an input signal and provides an output signal to an electrode, where the output signal generates an arc between the electrode and at least one workpiece, and the output signal has a desired output power profile. The power supply has at least an output power circuit which determines an output power of the output signal, a power differential calculator which determines a difference between the determined output power and the desired output power profile, and a waveform generator which changes a power output of the output signal based on the determined difference between the desired output power profile and the determined output power.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
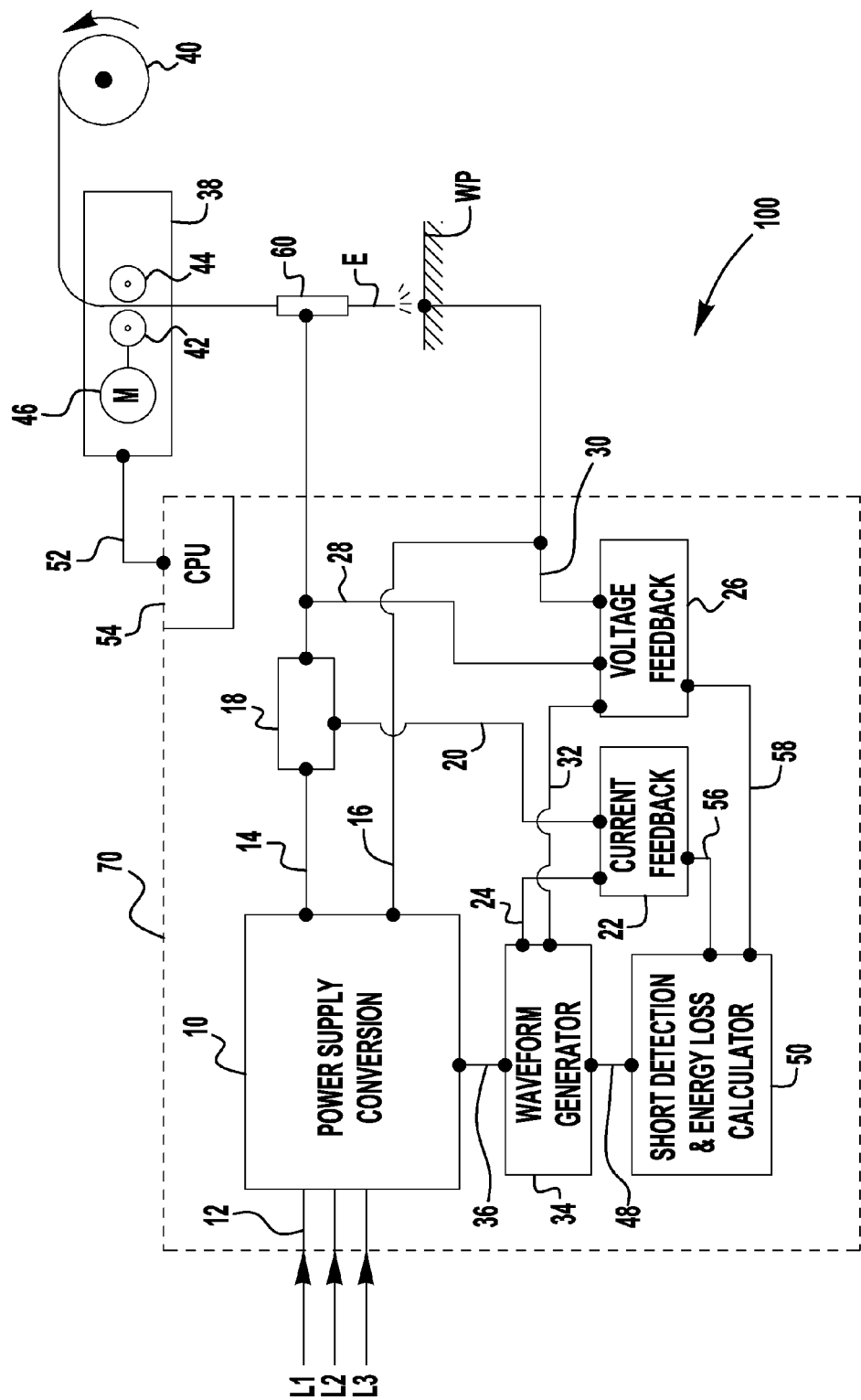
FIG. 1 illustrates a diagrammatical representation of a weld system that can be utilized incorporating an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 illustrates an arc welding system 100 in accordance with an exemplary embodiment of the present invention. In exemplary embodiments of the present invention, the welding system 100 can be any type of welding system that is welding using any form of MIG welding, GMAW, GMAW-pulse welding, short circuit welding, surface-tension-transfer (STT) welding. Of course, other types of welding can be used with embodiments of the present invention. Exemplary embodiments of a welding circuit, control arrangement and welding waveforms for such types of welding are disclosed in U.S. Pat. Nos. 4,972,064, 6,215,100, and 7,304,269 which are each incorporated herein by reference in their entirety. Accordingly, only a general discussion of the welding power supply 100, its waveform generator and control, or the various disclosed welding waveforms will be discussed below.

As stated above, FIG. 1. depicts an exemplary welding system 100 in accordance with an embodiment of the present invention. The system 100 includes a power supply 70, which is capable of generating a plurality of current pulses and direct those current pulses to an electrode E as it is advanced towards a work piece WP. An exemplary embodiment of the power supply 70 includes a power source 10, which may be for example, a high switching speed power source, such as an inverter or chopper. The power source 10 is generally the component which provides the welding waveform to the electrode E and can have any type of structure and configuration that is capable of being used to generate welding waveform capable of welding as reference herein and clearing a short circuit, if experienced during welding. The power source can include, for example, rectifiers, inverters, converters, boost circuits, buck circuits, and the like. As shown, the power source 10 has an input power 12 illustrated as a three phase electrical input. Of course, a single phase input power supply having various voltages and frequencies or even a motor or engine driven generator or alternator could be used to direct electrical power to converter or power source 10. Output leads 14, 16 are connected in series across the electrode E and work piece WP to perform a welding process, such as for example a GMAW-P process, by directing an appropriate current waveform (for example, pulses) to the electrode and work piece. In one embodiment of subject system and method, the welding electrode E is a continuous wire which may be a flux cored wire; but in the alternative, a solid wire may be used. Accordingly, the welding wire electrode E may be self-shielding or instead may use an external shielding, for example, from an external shielding gas or flux blanket. To the extent any shielding may be used, the shielding gas/flux supply is directed into the welding operation between the electrode and work piece in accordance with standard practice.

In an exemplary embodiment, the power source 10 delivers a welding current defined by a plurality of pulses to the electrode wire E for use in a welding operation between the electrode E and a work piece W. Accordingly, the welding current is sufficient to form a welding arc between the tip of the welding wire electrode E and the work piece W during the pulses. The welding arc may be defined by an arc current and/or arc voltage, or any other acceptable means. In an exemplary embodiment, a LEM 18 determines the arc current by creating a signal in line 20 directed to feedback circuit 22 so that the output signal on line 24 is a digital or analog representation of the actual output current at any given time. In a like manner, voltage feedback circuit 26 has inputs 28, 30 for sensing the instantaneous arc voltage of the welding operation to create a signal in output 32. This voltage signal is a digital or analog representation of the instantaneous arc voltage. The arc current and voltage are directed in a feedback loop to waveform generator 34 which generator is set to create a series of current waveforms or pulses with a selected profile, in accordance with a signal in control line 36. The control signal represents the desired welding current. Output control signal in line 36 is either in the form of digital instructions, a program statement or an analog command signal in accordance with waveform processing. In one particular embodiment of waveform process for welding, the control of the power source 10 using a waveform generator 34 is in accordance with Waveform Control Technology™, an electronic waveform control system and method from The Lincoln Electric Company of Cleveland, Ohio. Alternatively or in addition to, the control signal in line 36 may be generated by standard waveform process technology known in the art, for example, as described in U.S. Pat. No. 7,173,214, which is incorporated herein by reference in its entirety. The power source 10 can include a controller, which may be embodied as a pulse width modulator circuit, normally a software signal, which circuit controls the waveforms in the welding process between electrode E and work piece WP. In general, the power supply 70 can be constructed similarly to known welding power supplies which are capable of performing pulse welding operations, such as MIG, GMAW-P, spray arc transfer, surface tension transfer (STT), or other similar pulse welding operations. An example of such a welding power supply is the Power Wave®, manufactured by The Lincoln Electric Company of Cleveland, Ohio.

As also shown in FIG. 1, the power supply 70 contains a short detection and energy loss calculator 50, which is coupled to the waveform generator 34 via lead 48. The calculator 50 receives inputs from at least the current feedback 22 and voltage feedback 26 circuits via leads 56 and 58, respectively. The calculator uses this information to detect short circuit events and determine aspects of the short circuit—which will be described more fully below. The calculator 50 can be any type of circuit/module which is capable of receiving information from each of the voltage and current feedback circuits and monitor that information as well as calculate various parameters based on the received information, and then provide that information to the waveform generator 34 so that appropriate modifications to the welding waveform can be made. It is noted that although the calculator is shown as a separate structure from the waveform generator 34, it can also be embodied in the waveform generator 34, where the generator 34 is the type of a device that receive the feedback data, make calculations and determinations based on that data and then provide waveform generation instructions to the power source 10 to output the desired waveform.

The power supply 70 also contains a CPU 54, or similar computer processing device, which is capable of controlling the operation of the power supply 70 and receiving external information from other devices, such as a wire feeder 38. For example, the CPU 54 is capable of receiving information from the wire feeder 38 via a connection 52 (which can be wired or wireless), and such information can include wire feed speed and/or total amount of wire (electrode E) fed per unit time. The power supply 70 utilizes this information to control its operation as needed, and/or the power supply 70 can use this connection to control the operation of the wire feeder 38. Such a control relationship is generally known and need not be described in detail.

Also, as shown, welding electrode E is shown schematically in FIG. 1 as being fed by the wire feeder 38. In one exemplary embodiment of the wire feeder 38 the electrode wire E is pulled from a spool 40 between drive rolls 42, 44 which are rotated by motor 46. The electrode wire E may be fed through a flexible conduit or sleeve 48 into a welding torch or gun 60 used either in an automatic, semi-automatic or manual welding process. The welding torch 60 is used to direct electrical current from the power supply 70 to the wire electrode E.

Figure 2:
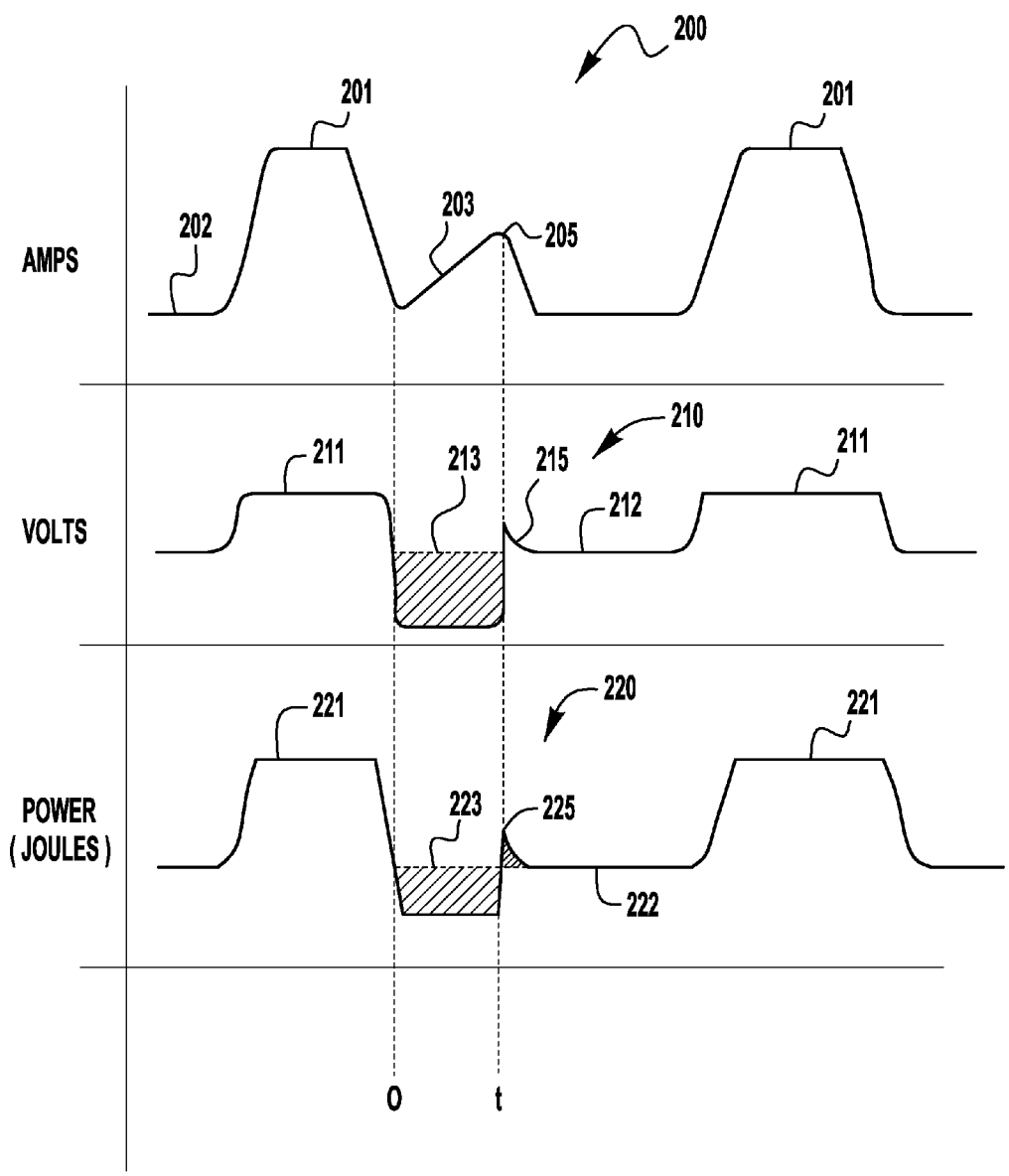
FIG. 2 illustrates a diagrammatical representation of welding current, voltage and power waveform experiencing a short circuit.

Turning now to FIG. 2, a current waveform 200, voltage waveform 210 and power waveform 220 are shown for a pulse welding operation. The depicted waveforms are intended to be exemplary and representative and embodiments of the present invention are not intended to be limited to welding applications using waveforms of the type depicted. The waveform 200 is a current waveform having a plurality of pulses 201 which are used as the primary transfer mechanism to transfer molten droplets of the electrode E. Between each of the pulses 201 is a background portion 202 which has a relatively low current level. As is generally known, during welding a short circuit event can occur, which is depicted at 203, causing the current to increase relative to the background level 202. As described in some of the patents incorporated herein by reference, when a short circuit event is detected by the power supply 70 a short circuit clearing operation is implemented which can result in a pulse 205 (for example, a short circuit clearing pulse) which is used to aid in breaking the connection between the electrode E and the work piece WP. A representative corresponding welding voltage waveform 210 is shown, where the voltage has peak levels 211, a short circuit portion 213, a short clearing event 215 and a background voltage level 212. Because such waveforms and clearing functions are generally known, they will not be described in detail herein. As shown, until the current waveform 200 is restored to its normal operation the current and voltage of the welding waveform can be affected such that energy is lost during the short circuit event. That is, during a short circuit and/or a short circuit clearing event an amount of joule energy (current×voltage×time) is lost, as compared to the desired welding waveform profile. This is depicted in the power waveform 220, which represents the power output by the power supply. As seen the waveform 220 has pulses 221 and a background level 222 that coincide with the pulses and background of the current and voltage waveforms. Additionally, as seen, during the shorting event 223 power drops and is thus lost from time 0 to t. The portion 225 corresponds to the short clearing events 205 and 215.

In traditional welding applications, short circuiting of the electrode to the puddle is common and in many cases, part of the process. These short circuits clear, the arc is re-established and the process continues normally. But in some rare and unwanted occasions, the electrode remains shorted to the puddle for an extended duration, stubbing to the workpiece. If and when the stub breaks, it does so with explosive reigniting of the arc often releasing excessive spatter and even projecting hot pieces of metal to the surrounding area. By examining electrical traces, it was discovered that there are tell tail indications that could have predicted these unwanted stubbing events. Looking three to six cycles before the stub, the duration of the short circuiting events increases ever longer until the process stopping stub event occurs. Normal short circuit events are followed by an elevation in current held to put back some of the power lost by the low power shorting event (323 in FIG. 3). But the shorting events just prior to stubbing become longer and longer. The power replacing profile 325 (FIG. 3) cannot keep up with the power lost during the short circuit. The result is a spiraling degradation of the droplet transfer control mechanism. This can significantly and adversely affect the stability of the welding process.

Figure 3:
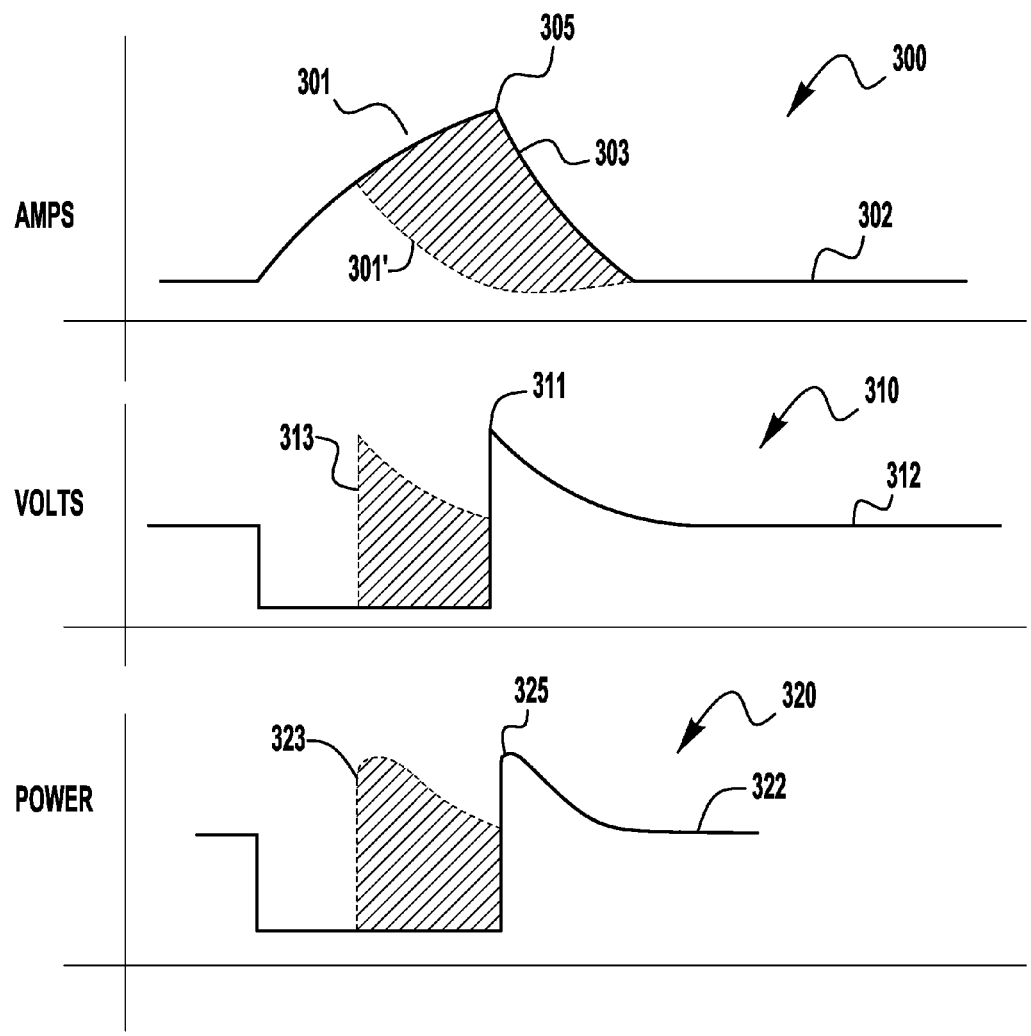
FIG. 3 illustrates a diagrammatical representation of another welding current, voltage and power waveform experiencing a short circuit.

FIG. 3 is another exemplary welding waveform which can be used for short arc welding, or the like. In this welding, again the current waveform 300 has a plurality of shorting events 301, with a background 302, which can be affected by an extended or out-of-sync short circuit event which causes the current profile to be changed from the desired current profile 301' to a new current profile 303 having a peak current 305. Similarly, the voltage waveform 310, having a background 312 and voltage peaks 311, can be affected, where the shorting event causes the desired voltage profile to be changed such that a drop 313 in voltage is realized. Again, this results in a loss of output power as shown in the waveform 320, where 323 shows the power lost during a shorting event. The peak 325 is the power as the short is cleared which decreases 321 to a background level 322. In short arc or surface tension transfer-type welding operations, such shorting event anomalies can extend in time and thus cause delays such that the waveform frequency becomes unstable, which can destabilize the welding process. FIGS. 2 and 3 are intended to be exemplary graphical representations of welding waveforms which can be utilized with embodiments of the present invention, which are experiencing an energy loss event—such as a short circuit event. But embodiments of the present invention are not limited to these waveforms.

Embodiments of the present invention overcome these disadvantages by adding/replacing power lost during a short circuit event back into the welding waveform subsequent to the shorting event. That is, embodiments of the present invention determine an amount of power (i.e., joules) lost during a short circuit event and modifies the welding waveform such that at least a portion of the lost power is added to the waveform after the power loss event (e.g., a short circuit). This will be explained further below.

Figure 4:
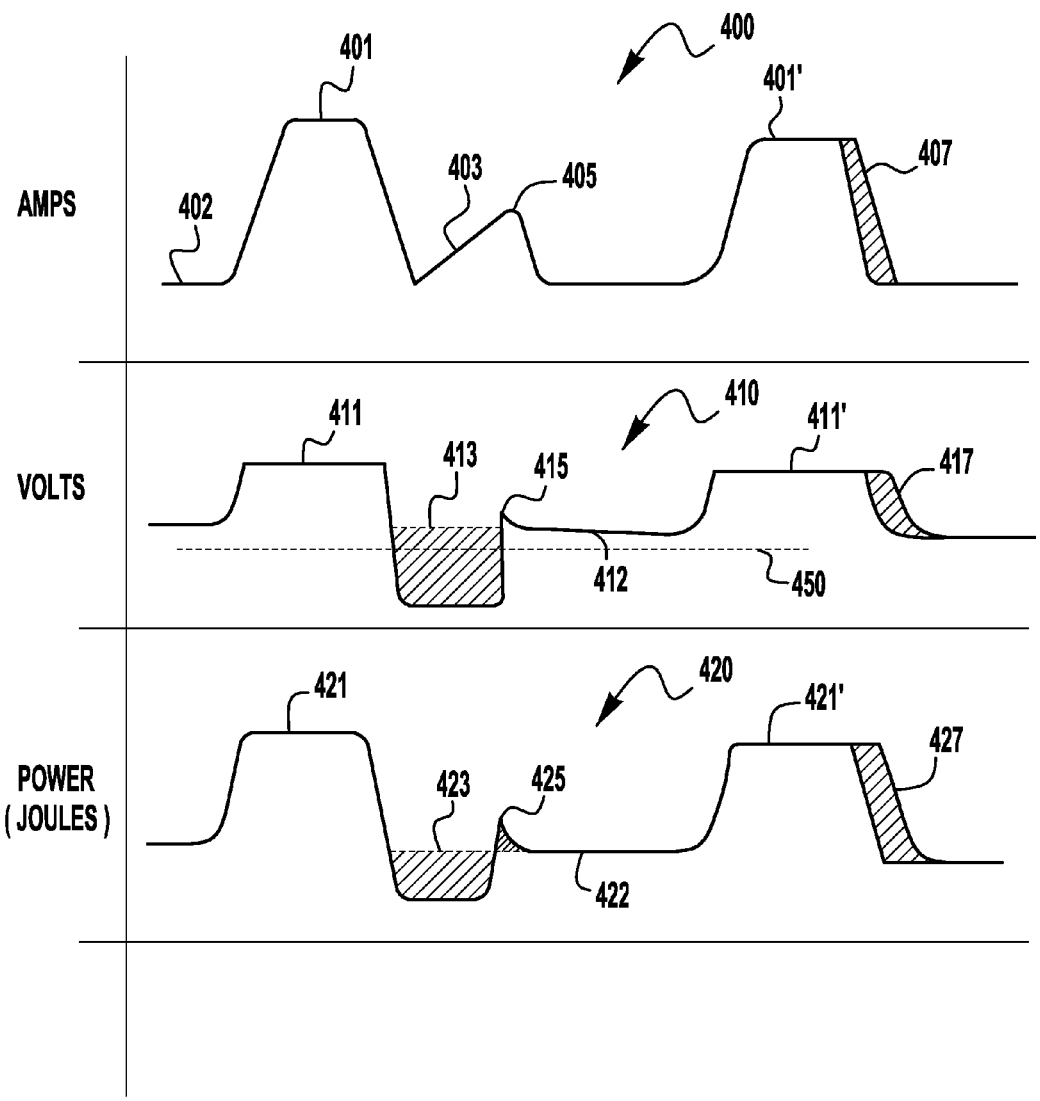
FIG. 4 illustrates the diagrammatical representation of welding current, voltage and power waveform from FIG. 2 demonstrating implementation of an exemplary embodiment of the present invention.

FIG. 4 depicts representative current 400, voltage 410 and power 420 waveforms for a welding operation—similar to that shown in FIG. 2. As with FIG. 2, the current waveform has a pulse 401, background current 402, and experiences an energy loss event (e.g., short circuit) 403. Also shown is a pulse 405 which can be used to aid in clearing a short circuit. Such a pulse can be a plasma boost pulse. Similarly, the voltage waveform 410 has a pulse 411, background 412, energy loss event 413, and voltage pulse 415. Also, the power waveform 420 has pulses 421, a background 422, a short circuit power loss event 423 and a power pulse 425 after the short circuit event 423. Again, as explained above, because of the short circuit event the output power drops as shown at 423. However, this figure also shows that the following pulses 401', 411' and 421' have a different profile than the leading pulses 401 and 411, respectively. This will be explained further below.

As discussed above, during welding power loss events (such as short circuits) occur during welding which can cause the welding waveform to be modified from its desired state. This modification can result in a change of power output in the welding waveform, and more specifically a loss of power. This loss can be detected by the power supply 70 and its internal components. More specifically, during welding the current feedback circuit 22 and the voltage feedback circuit 26 are used to monitor the real time welding voltage and current and provide that information to a circuit, such as a short detection and energy loss circuit 50. (In alternative embodiments, this circuit can be internal to a waveform generation circuit 34, or similar type circuits.). The energy loss circuit 50 monitors the current and voltage feedback information to determine if either, or both, of the detected current and voltage are at a level less than that of the desired waveform profile as dictated by the welding operation (and can be, for example, created by the waveform generator 34). Thus, a comparison is made between the desired welding current and voltage and the actual current and voltage, and any differences are recognized. Additionally, although not expressly shown, a timer circuit—which can be internal to the energy loss calculator 50—determines an amount of time that either, or both, of the current and voltage are different from the desired voltage and/or current. With this information, the calculator circuit 50 is able to determine an amount of energy lost (or added) to the actual welding operation because of variances between the desired and actual welding waveforms. This information is then sent to the waveform generator 34 which modifies the welding waveform (current and/or voltage) to add at least a portion of the lost energy back into the welding waveform. The waveform generator 34 can do this modification on its own, or can also receive information/control from other components such as the CPU 54, or like components which are used to control/modify the welding voltage and/or current waveform. Thus, during welding changes in the actual voltage and/or current are detected such that it is determined that the actual voltage/current is different from the desired voltage/current causing a difference in energy provided by the welding operation. It is noted that although the following discussions are directed to detecting a loss of energy, embodiments of the present invention can be similarly used to detect increases in the output energy as compared to a desired output.

In an exemplary embodiment, the calculator 50 receives feedback information from each of the circuits 22 and 26, and from that information determines that the actual voltage and/or current are lower than a desired current/voltage level. This can occur, for example, during a short circuit event. The calculator determines an amount of time in which the actual voltage/current is below the desired level. In some exemplary embodiments, the calculator 50 tracks the duration of differences of both the voltage and current levels, to the extent those durations are different. With this information, the calculator 50 then determines a total amount of power (e.g., joules) which have been lost (or gained) during the actual welding operation. This information is then used by the CPU 54 and/or the waveform generator 34 (or similar components) to determine a modification to the output waveforms to put at least a portion of the lost power back into the waveform.

For example, as shown in FIG. 4, the following pulse 401' has had the pulse width of its peak current increased over the previous pulse 401. That is, the duration of the peak current has been extended as compared to the prior pulse 401, which is shown as new region 407. Thus, the overall current (and thus power input) by the following pulse 401' has been increased. This is shown by the shaded area of the pulse 401'—which shows additional arc energy placed back into the welding operation after the loss of energy by the short circuit 403. Additionally, in the embodiment shown the voltage waveform 410 has been modified such that the following pulse 411' was modified (at 417) to increase the overall power of the welding waveform at the subsequent pulse. This increase in power is reflected in the increased power (region 427).

By placing the lost energy back into the waveform in the following pulse, embodiments of the present invention can quickly stabilize the welding operation after an event which interrupts or disturbs the desired welding waveform. That is, embodiments of the present invention can provide an ongoing real-time power correction in the welding waveform during the welding process.

As shown, in this embodiment of the present invention only the pulse width of the current and voltage has been modified to provide an increase in the output power. However, in some exemplary embodiments the peak levels of the pulses 401'/411' (and thus 421') can also be changed. Further, in other exemplary embodiments, only one of the peak level or pulse width of the current and voltage pulses can be changed to provide the desired power increase in the power pulse 421'. That is, it is not necessary to change only one of, or both, of the peak level and pulse width duration of following pulses to add the lost power. Rather, they can be used individually or in combination to achieve the desired power addition. More specifically, in some embodiments it may only to be needed to increase one of the peak level or pulse width to add the power back into the welding operation. For example, for some welding operations, it may not be desirable to increase the peak current of the following pulse 401', and thus embodiments of the present invention will only change the duration of the peak current—which effectively increases the power (joules) output. Alternatively, it may be desirable to keep the duration of the peak pulse at the same pulse width, and thus embodiments of the invention change the peak current level—again increasing power output.

In the embodiment shown in FIG. 4, all of the energy to be put back into the welding waveform is put back in the pulse 421' which immediately follows power changing event (e.g., short circuit). However, as shown below other embodiments can spread the energy out over a plurality of pulses.

Further, in the embodiment shown in FIG. 4 all of the energy lost in the shorting event is replaced in the following pulse 421'. That is, in some exemplary embodiments the energy replacement is a 1-for-1 relationship. Stated different, in some exemplary embodiments for every one joule of power lost one joule of power is added back into the waveform. Such embodiments ensure that no power is lost, and may be desirable in some applications.

However, in other exemplary embodiments of the present invention an energy constant "K" is used to determine what percentage of lost power is added to the welding operation. Specifically, in some embodiments it may not be necessary to provide a one-for-one joule replacement, and a lesser percentage of the lost power need be placed back into the output to provide a stable welding operation. For example, embodiments of the present invention can have a power constant K in the range of 75 to 90% such that 75 to 90% of the lost power is added back into the welding output. In such embodiments, the calculator 50 can use the equation (Amps*Volts*Duration*K) to determine the amount of power to be added into the welding waveform after an energy loss event.

In some exemplary embodiments, the power constant K will vary depending on various welding parameters and variables. For example, in some embodiments the power constant K can vary based on the amount of power lost or gained during a power loss/gain event. This relationship between the power constant K and the lost power amount can be implemented in a number of ways. For example, a direct relationship can be employed in which each power loss amount correlates to a determined power constant K—such as through the use of a relationship equation which can be predetermined/preprogrammed for a specific power supply 70 or determined based on various welding input parameters (including, but not limited to, current, voltage, wire feed speed, heat input, etc.). In other embodiments, the power constant K can be determined based on the utilization of thresholds or ranges. For example, in some embodiments, if the calculated power loss is above a first threshold the power constant K can be 1—indicated a one-for-one joule replacement, where if the power loss is at or above a second threshold value but below the first threshold value the power constant can be in the range of 50 to 85%. Further, it may be the case that the determined power loss is so low such that there is no need for the addition of power in the welding operation. Thus, in some embodiments, if the power lost is below a bottom threshold the power constant K is 0, so that no power is placed back into the welding waveform.

In exemplary embodiments, the value of the power constant K, and the threshold values (for example, first and second threshold values) is preset in the power supply 70, while in other exemplary embodiments these values are determined by the CPU 54 based on user input information prior to welding, which can include wire feed speed, heat input, current input, voltage input, and other user input parameters. These constants and thresholds can be determined based on desired system performance, and can be determined based on preprogrammed algorithms, or the like.

In addition to the foregoing, additional methods of implementation and control can be utilized. For example, as shown in FIG. 4 a voltage threshold level 450 can be utilized by the calculator 50 to determine whether or not a power addition operation needs to be implemented. Specifically, during welding the voltage level is monitored (as described above) and the calculator 50 will only conduct a power replacement operation (as described above) when it is detected that the voltage drops below the voltage threshold level. That is, when the voltage drops below the threshold 450 it is determined that a power loss event is occurring, and based on that detection the calculator 50 conducts a power loss calculation by comparing the actual power output (voltage, current and timing (0 to t)) to the desired power (voltage, current and timing). Thus, when the voltage is detected below the threshold 450 the calculator 50 accumulates the difference between the actual output power (joules) and the desired output power (joules). In some exemplary embodiments, the calculator 50 only accumulates the lost power that occurs after the voltage drops below the voltage threshold level 450. However, in other exemplary embodiments, the calculator 50 accumulates and determines all of the power lost during the power loss event. In exemplary embodiments of the invention, the calculator 50 stops accumulating the lost power when the voltage reaches or passes the threshold level 450 at point t, indicating that the power loss event has ended. In other exemplary embodiments, the calculator 50 can accumulate the power difference for a duration of time and end at point t, regardless of the voltage level reached at that point. In such embodiments, it can be determined that after a period of time, the power supply 70 will have returned to a normal power output level (for example, due to a short clearing event, etc.). Thus, in some exemplary embodiments, the calculator 50 will accumulate the lost power for a duration t after the voltage falls below a threshold voltage 450. In an exemplary embodiment, this duration is in the range of 100 to 500 ms. However, in exemplary embodiments, so long as the voltage remains above the threshold level 450 it is deemed that acceptable welding is occurring and as such no modification of the waveform to add power is implemented.

In other exemplary embodiments, the accumulated power difference is utilized as described below. In such embodiments, the accumulated power difference can be identified and stored as a global joule factor (GJF) in the calculator 50, or other appropriate device or component used to modify the welding waveform. This global joule factor is used by the calculator 50 and waveform generator 34 to regulate the welding waveform as described herein. Specifically, this global joule factor is used to determine the amount of power that has been lost (or gained) and is then used to determine the modifications, if any, to the current and/or voltage outputs to obtain a desired additional power output. For example, in exemplary embodiments the calculator 50 can use the equation:

Regulated Term=Defined Term×(1+Global Joule Factor)

where, the Regulated Term is the output factor (such as current and/or voltage and/or power) which is to be regulated to provide the lost power, the Defined Term is the desired or preset output parameter (current and/or voltage and/or power) which would be output by the power supply 70 as desired by the operating welding operation. Thus, of there is no power loss or gain, the Regulated Term will be the same as the Defined Term (the GJF will be 0). However, if there is a loss or gain the above equation will result in an appropriate modification of the output to provide the appropriate power output. In various exemplary embodiments, the global joule factor can take various forms as desired. For example, in some exemplary embodiments the GJF can simply be a ratio or numerical value which is associated with the determined gain or loss of power. This can be determined via look-up tables or state tables and predetermined and preprogrammed into the power supply 70. For example, in some embodiments, the GJF is a value between −1 and +1. Thus, during welding it can be determined that a detected accumulated power difference equates to a GJF of 0.4. In such an embodiment, the Defined Term would be multiplied by 1.4 to determine the Regulated Term. In other exemplary embodiments, the GJF can simply be a value, in joules, of the power loss/gain.

In further exemplary embodiments, the above equation can take into account the K factor, previously discussed. Specifically, as described above a K factor can be used to determine a % or amount of power to be added or removed from the output power based on various factors. This K factor can be taken into account by using the equation/relationship:

Regulated Term=Defined term×[1+(K×GJF)]

In this equation, the K factor is taken into account, such that if the K factor is 1 then there is no difference between this determination and the one discussed prior. However, if the K factor is determined to be a less than 1 then this equation takes that into account when determining the modifications to waveform as described herein.

In other exemplary embodiments, the following relationship/equation can also be utilized:

Regulated Power=Defined Power+(K×GJF)

where the GJF is simply the accumulated power difference in joules. Here the calculator just simply determines the new output power level, and then the waveform generator modifies the current/and/or voltage outputs to obtain the desired power output.

As described above, embodiments of the present invention can distribute the accumulated power difference (added or subtracted) over a plurality of following pulses, and in such embodiments the above equations can be modified such that the Regulated Term (Power) is divided by the appropriate denominator to determine the appropriate distributed change in the output.

Figure 5:
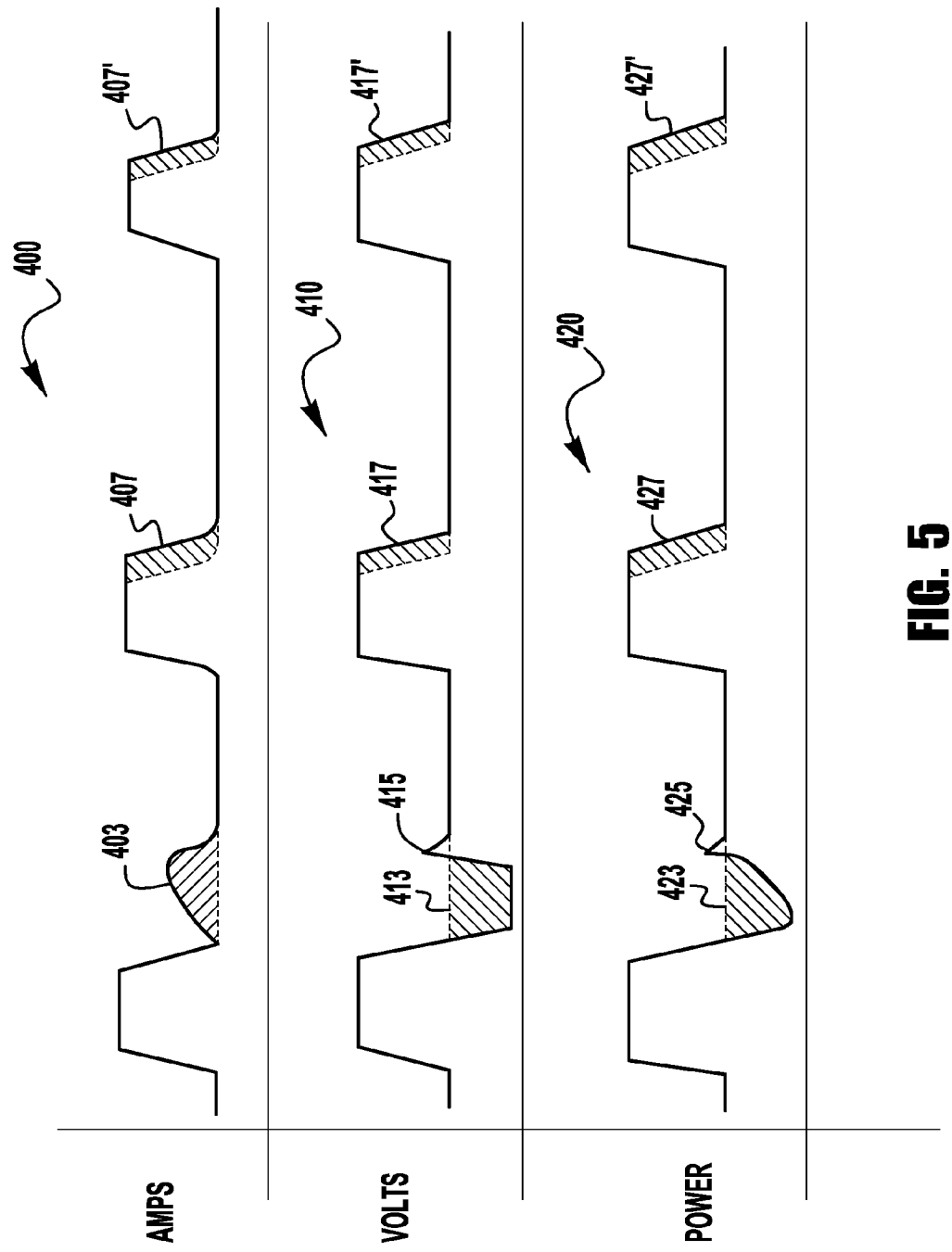
FIG. 5 illustrates the diagrammatical representation of a welding current, voltage and power waveform from FIG. 2 demonstrating implementation of another exemplary embodiment of the present invention.

FIG. 5 depicts another embodiment of the present invention, where the added power 427 and 427' is distributed over a plurality of pulses following the power loss event 423. Thus, rather than adding all of the lost power into a single pulse following the power loss event 423, the waveform generator 34 and/or CPU 54 add the lost power over a plurality of pulses. Such embodiments aid in making the power addition to the welding waveform more even, and in some cases, easier to implement over the following pulses. However, because it is desirable. In some applications, to replace the lost power quickly, embodiments of the present invention add the lost power quickly. In some exemplary embodiments, the lost power is distributed over no more than 10 following pulses, and in another exemplary embodiment the power is added over no more than 5 pulses following the power loss event.

It is also noted that in some exemplary embodiments, the added energy is added evenly over the following plurality of pulses, while in other exemplary embodiments the amount of power added to the plurality of pulses can be different per pulse. For example, in some exemplary embodiments the amount of power being added to the plurality of pulses decreases, such that the first following pulse has the highest amount of added power, with the amount of added power decreasing after that until the determined amount of added power has been completely added back to the welding operation.

Figure 6:
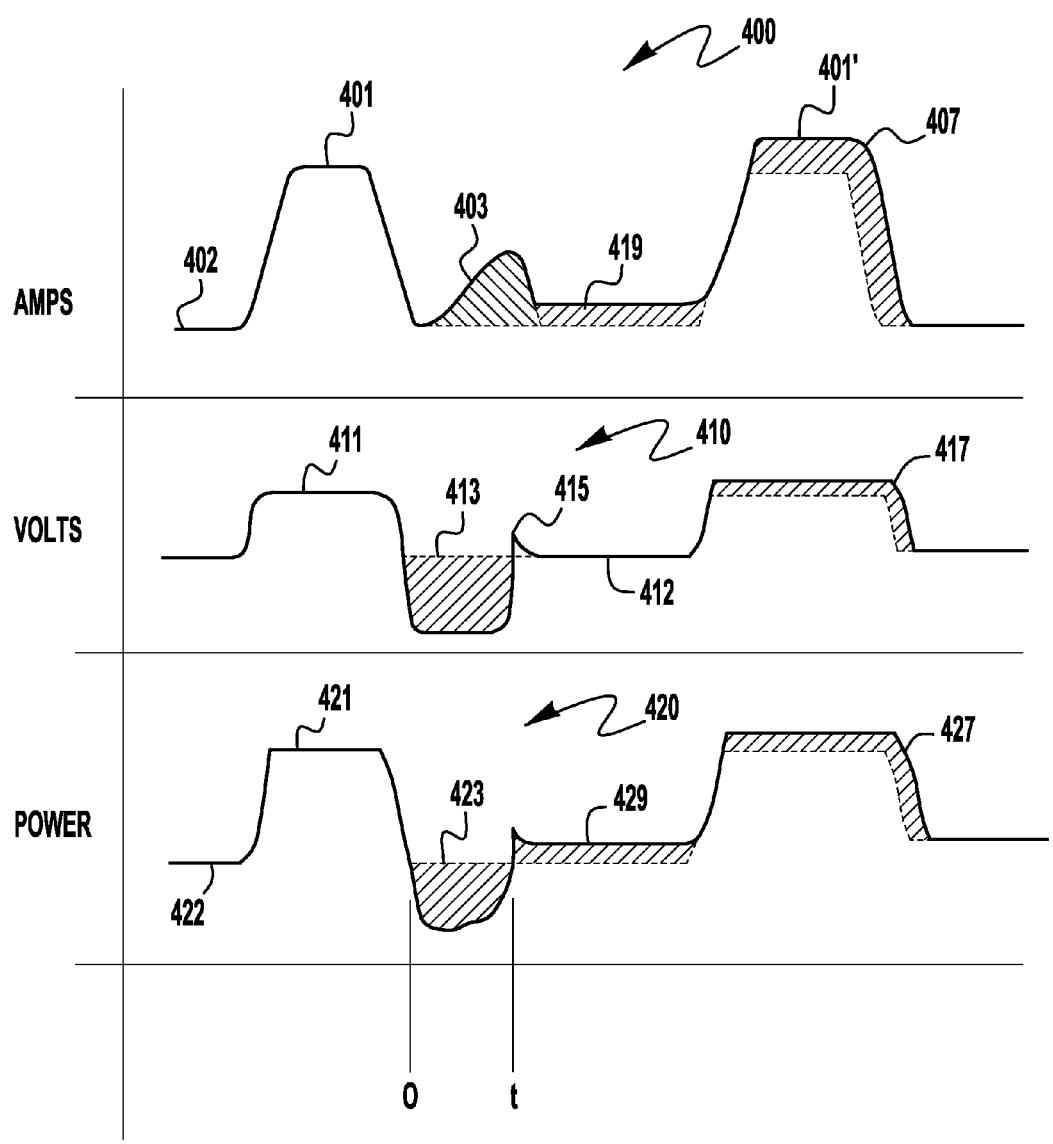
FIG. 6 illustrates the diagrammatical representation of welding current, voltage and power waveform from FIG. 2 demonstrating implementation of a further exemplary embodiment of the present invention.

FIG. 6 depicts another exemplary embodiment of the present invention. In this embodiment, at least some of the power which was lost during the power loss event 423 is added back into the waveform during the background portion 422 of the waveform. That is, a new current level 419 is used during the background which is higher than the normal current 402 for the background. For example, the CPU 54 and/or waveform generator 34 can increase the current and/or voltage level of the background portion 402/412 of the waveform to add power back into the waveform. This is shown as the increased power 429 in the power waveform 420. Further, as shown in the embodiment, some of the power 427 is also added via a following pulse. Thus, in some exemplary embodiments all of the added power can be added via either a following pulse or a following background region, or a combination of both. Further, like embodiments described above, if the background is used to provide power back into the waveform, the power can be added back into only the background directly preceding the next following pulse, while in other embodiments the energy can be distributed over a plurality of background portions following the energy loss event.

Figure 7:
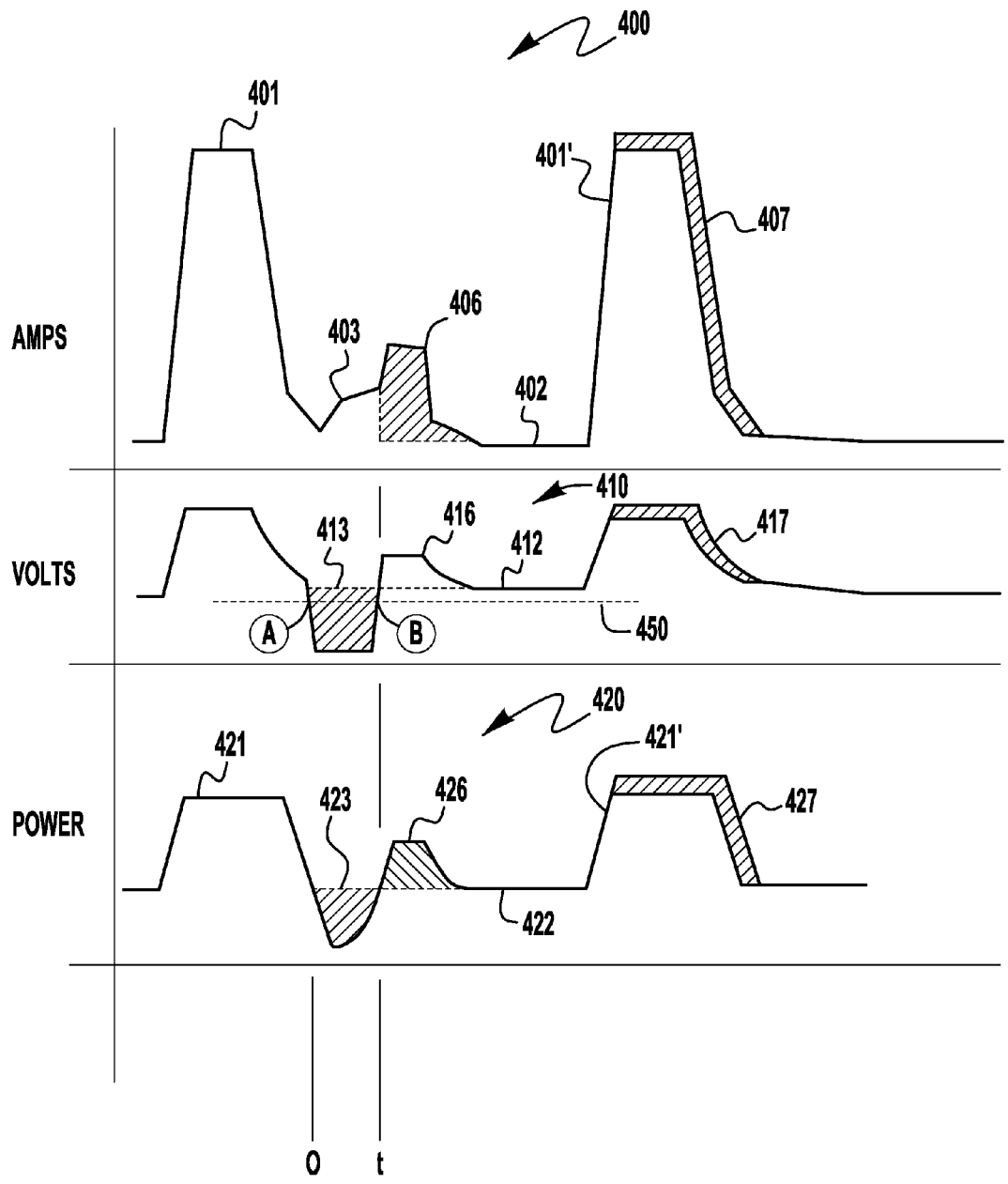
FIG. 7 illustrates the diagrammatical representation of welding current, voltage and power waveform from FIG. 2 demonstrating implementation of an additional exemplary embodiment of the present invention.

FIG. 7 depicts another exemplary embodiment of the present invention, where the waveform generator 34 and/or CPU 54 also takes into account any energy put back into the welding operation from a plasma boost pulse 406/416, or similar operation. As described earlier, there are various types of known waveforms that use short clearing or plasma boost pulses 406 to aid in clear short circuits. These clearing pulses typically have current 406 and voltage 416 levels higher than the background levels and thus can result in adding power 426 to the welding operation after a power loss event 423. Embodiments of the present invention, can take into account this added power 426 so that the power 427 added to any subsequent pulse(s) is not excessive or unnecessary.

For example, in embodiments of the present invention, the amount of power to be added to the waveform in any one, or plurality, of following pulses will be the difference between the power lost during an power loss event 423 and any power 426 added following the power loss event 403/413/423. Thus, the power added 427 will be (Power Loss Event (joules) *Energy Constant K)−(Power Added (joules)). Thus, the power added 427 to the pulse 401' will take into account any power added prior to the pulse 401'. In some exemplary embodiments of the present invention, various power threshold levels can be used to determine the affect of any of the added power 426. For example, if the added power 426 is over a determined threshold there is no need to add power in a following pulse 421', while if the added power 426 is below the threshold power will be added to the pulse(s) 421' as described above. Similarly, if the added power 426 is below a lower threshold the added power 427 to the pulse(s) 421' will not take into account the added power 426, while if the added power 426 is above the threshold the added power 426 will be taken into account to determine the amount of power 427 to be added to the following pulse(s) 421'.

For example, in some embodiments, if the short circuit clearing power 426 is at or below a first threshold percentage of the lost power 423 the short circuit clearing power 426 is not taken into account for the added power 427, if the short circuit clearing power 426 is between the first threshold and a second threshold the short circuit clearing power 426 is taken into account in the added power 427, and if the short circuit clearing power 426 is at or above the second threshold no added power 427 is used. This is because the power 426 from the short clearing event has essentially added the needed power into the waveform 420. In some exemplary embodiments, the first threshold is in the range of 0 to 30% of the lost power 423, and the second threshold is in the range of 80 to 100% of the lost power 423.

In other exemplary embodiments, the power supply 70 can take into account the amount of power lost during a period of time, and only add power in the welding waveform if the lost power exceeds a determined power loss threshold. Stated differently, the power supply 70 (including its internal components) monitors the amount of lost power (e.g., from power loss events) over a period of time and if that ratio exceeds a threshold ratio, power is added as described above. In such embodiments, the power supply 70 does not necessarily add power when a single power loss event is detected, but rather accumulates an amount of lost power during a period of time (for example, during 500 ms) and if the amount of power lost in that time period exceeds an acceptable amount then a power amount is added back into the waveform, as described above. This ratio threshold can be determined based on user input information, including but not limited to wire feed speed, heat input data, current input, voltage input, etc. Thus, based on input data the threshold ratio is determined and if the amount of power loss per unit time is detected then the power supply adds power as described herein.

For example, in some exemplary embodiments the accumulated difference in output power is evaluated as a running average, such that the power supply 70 alters its output power only when the accumulated difference over that running average exceeds a threshold amount. Such embodiments do not react to a single power loss (gain) event unless it is large enough to exceed the desired threshold. In some embodiments, the accumulated power difference can be a running average over a period of waveform cycles. For example, some embodiments can use a running average over the previous 3 to 10 cycles and determined the accumulated difference in output power to desired power over those cycles to see if a correction need be made. While in other embodiments the running average can be monitored over a duration of time, for example over a period of 10 to 500 ms, and similarly determine if the accumulated difference requires an alteration to the output power. In other exemplary embodiments, the duration is in the range of 10 to 100 ms. In such embodiments, the GJF can be representative of the accumulated difference in the running average as described above.

Embodiments of the present invention can use various mechanisms to track a running average or accumulated power difference over a period of time and remain within the spirit and scope of the present invention, as described above. In some exemplary embodiments, the power supply 70 (and its various components) utilizes the period of a waveform cycle—which can be based on the active wire feed speed of the electrode E. Thus, the number of cycles can be calculated for a specific duration of time, and then the accumulation is made over the determined number of cycles for a determined period of time (e.g., 9 cycles). Alternatively, a period of time can be calculated—for example, it is desired that the running average must take into account 5 cycles, so the total duration in time is determined based on the desired number of cycles and the calculated period for one cycle. Alternatively, an update flag mechanism can be used such that when an update flag is set the calculator 50 begins monitoring the time in power altering event (such as a shorting event) and accumulates any power loss/gain. As the duration of the power altering event (such as time in a short) increases, a factor (such as the GJF) increases and if the factor hits a threshold before the expiration of the running time/number of cycles then a power changing event is triggered. However, if the threshold is not reached at the expiration of the duration/cycles, the GJF (or similar factor) is reset and the process is repeated.

In another exemplary embodiment, it is desirable to maintain a power input/consumable length ratio during welding. Stated differently, embodiments of the present invention determine a ratio of power lost to length of electrode E consumed, and if the ratio exceeds a threshold then power is added to the welding operation as described herein. That is, in some embodiments of the present invention it is desirable to ensure that a consistent amount of power is added to the welding operation per unit length of electrode E. In such embodiments, the wire feeder 38 communicates wire feeding information to the power supply 70 via the CPU 54, or similar device, such that the power supply 70 can determine the energy loss/consumable length ratio and if the energy lost exceeds a threshold ratio then the energy addition process is implemented as described herein.

In further exemplary embodiments, the accumulated power differences and/or global joule factor (or similar identification) can be used to control the output of the wire feeder. Specifically, the power supply 70 can communicate with the wire feeder 38 based on the detected accumulated power differences to control the wire feed speed of the wire feeder 38. For example, the power supply 70/CPU 54 could use the accumulated power difference and/or global joule factor to determine that the welding process is spiraling toward a stubbing event—where the electrode is likely to stub or fuse to the workpiece. This can be detected by detecting an increase in the duration of subsequent shorting events, which tends to indicate an imminent stubbing event. Using this information, the CPU 54 can instruct the wire feeder 38 to slow down the wire feed speed rate of the electrode E. This reduction in speed can aid in preventing a stubbing event, and when it is detected that a stubbing event is not likely to occur (for example, the duration of short circuit events is below a threshold duration) the wire feeder 38 is instructed to increase its wire feed rate.

Further exemplary embodiments of the present invention can use an additional/alternative control methodology. Specifically, embodiments of the present invention can use a short circuit ratio to control and regulate the addition or removal of power from the welding waveform as discussed above. Such embodiments monitor the amount of time that the operation is short circuit state and/or the amount of time that the operation is in an arc state. This can be accomplished using a number of different methods, all of which are within the scope of the present invention. For example, the power supply 70 (using the calculator 50 or other components) can monitor the total amount of operational time and then the amount of time that the electrode E is in a short circuit state. In another embodiment, the power supply 70 (using the calculator 50 or other components) can monitor the total amount of operational time and then the amount of time that the electrode E is in an arc state—where an arc is present. Using either of these methods, a simple difference calculation can determine the other of the short circuit or arc time. In another exemplary embodiment, the power supply 70 can monitor both the arc time and the short circuit time directly and not rely on a difference calculation. Further, the power supply 70 can use a number of methods to determine whether or not an arc is present or if a short circuit condition exists. In one exemplary embodiment, the voltage between the electrode E and the workpiece WP is measured and if the voltage is above a threshold level it is determined that an arc state exists, and if the voltage is below a threshold level then it is determined that a short circuit condition exists. In exemplary embodiments, the voltage threshold level is in the range of 1 to 20 volts. In another exemplary embodiment, the threshold is in the range of 5 to 20 volts. For example, if the threshold value is at 10 volts, the power supply 70 will determine (through calculation or direct monitoring) the amount of time that the output signal is above and below 10 volts. These times will be the arc and short circuit times, respectively. When these times are calculated and/or determine a short circuit ratio is determined, which is the ratio of short circuit time to arc time (short circuit time/arc time). The power supply can then increase or decrease the output power (as described above) based on a comparison of the calculated short circuit ratio with a threshold level. The threshold level can be determined by the power supply 70 (via the CPU 54, for example) based on user input information and/or based on the desired welding waveform or welding operation being used. That is, each possible welding waveform can have a different set of threshold ratios, based on user parameter input and the waveform being used.

In a further exemplary embodiment, rather than using a detected voltage threshold as described above, the power supply 70 can utilize a voltage threshold that is a percentage of a preset operating voltage—which can be preset as an input by a user. That is, embodiments of the present invention can monitor the voltage to determine if the voltage drops below a certain percentage of the preset voltage to determine that a short circuit event exists—which would trigger operations similar to that described above. In exemplary embodiments of the present invention the percentage value is at or below 70% such that when the voltage is detected to be at or below 70% of the preset operating voltage it is determine that a shorting event is occurring. In further exemplary embodiments the percentage is in the range of 30 to 70% of the preset voltage. In further embodiments, the percentage is at or below 50% of the preset voltage.

During operation, the detected short circuit ratio is compared to the threshold value and if it is above the threshold value this is evidence that the electrode E has been in a short circuit state longer than desired, and thus a loss of power has occurred. When this is detected/determined the power supply 70 increases the power output as described herein. If the short circuit ratio is below the threshold ratio, then it is determined that the output has had a higher power output than desired, and the power supply 70 adjusts the output power as desired.

Of course, in some operations it is desired to not have any short circuit events during operation. In these embodiments, the threshold ratio can be 0, such that any short circuit event will cause the short circuit ratio to be higher than 0 and a power addition operation will be initiated. However, in other embodiments, even though no short circuits are desirable a minimum acceptable threshold ratio can be utilized. In such embodiments, as long as the short circuit ratio is below the threshold ratio the output of the power supply 70 will not be modified as described herein. However, when the ratio exceeds the threshold ratio the power supply 70 will initiate a power addition operation as described herein. In some exemplary embodiments the short time/arc time ratio is in the range of 1/4 to 1/20. For purposes of clarity, if the threshold ratio is 1/10 this means that for every 1 ms in a short circuit state, there are 10 ms in an arc state. Of course, in other embodiments the threshold ratio can be different based on the output waveform being utilized.

In additional exemplary embodiments, the power supply 70 can utilize a threshold ratio range—having and upper and lower threshold—where the power supply 70 does not modify the output power as long as the short circuit ratio remains within the operational range. For example, many welding waveforms, such as surface tension transfer intentionally cause short circuit events to occur. However, if these events extend too long in time it can disrupt or destabilize the waveform. As such, embodiments of the invention can use the short circuit ratio to ensure that the operation is proceeding within desired parameters. For example, embodiments of the present invention can establish a short circuit ratio range having an upper limit and a lower limit based on at least some user input information and the waveform profile to be used. If the operation is proceeding such that the duration of short circuit time is too high the short circuit ratio will exceed the upper limit and the power supply 70 will increase the energy input based on a determined amount of energy loss as described above. If the short circuit ratio falls below the lower threshold limit it is determined that the operation has not be in a sufficient short circuit contact and the power supply 70 can adjust the output waveforms (such as frequency, pulse width, etc.) and/or decrease the power output as described above. In exemplary embodiments of the present invention, the threshold ratio range has an upper limit of 1/4 and a lower limit of 1/20. Of course, other embodiments can use a different range of range thresholds without departing from the spirit and scope of the present invention.

In exemplary embodiments of the present invention, the above described calculations are updated after each cycle in the welding waveform and a weighted, running average is maintained over a duration. In these embodiments, the system is constantly updating its running average of short circuit time after each welding cycle. When the system reaches a defined limit where the short circuit ratio exceeds the desired thresholds the system then initiates an energy replacement protocol as described herein.

In exemplary embodiments, the power supply 70 can determine the short circuit ratio and compare it to a threshold value at a predetermined sampling rate or at set duration periods. For example, embodiments of the present invention, can determine the short circuit ratio for every 100 ms, such that after every 100 ms the short circuit ratio is determined and a comparison is made. In other embodiments, the comparison can be done after a predetermined number of cycles. For example, after 10 cycles the short circuit ratio can be determined and compared to the threshold ratio. Of course other sampling techniques can be used without departing from the scope or spirit of the present invention.

Figure 8:
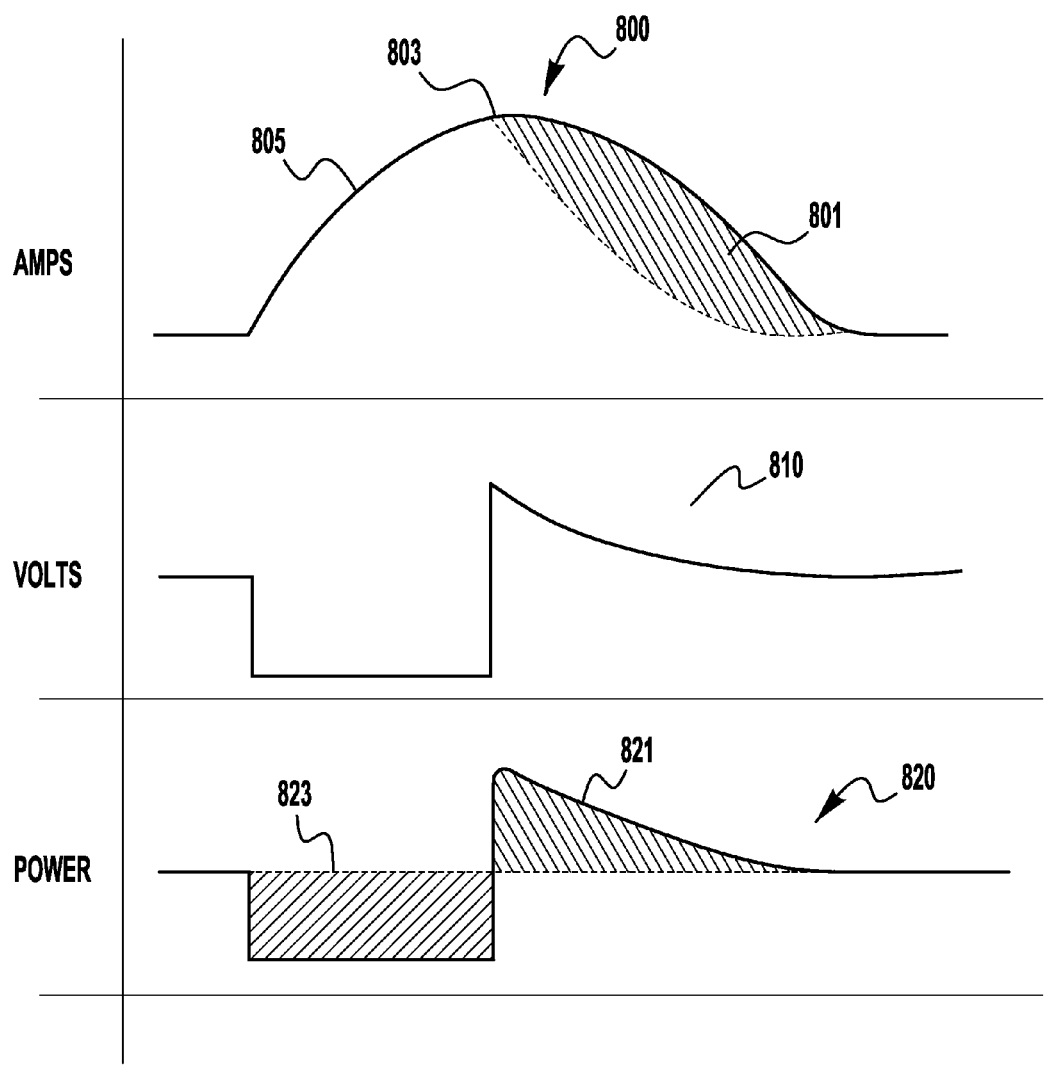
FIG. 8 illustrates a diagrammatical representation of a further welding current, voltage and power waveform demonstrating implementation of an additional exemplary embodiment of the present invention.
Figure 9:
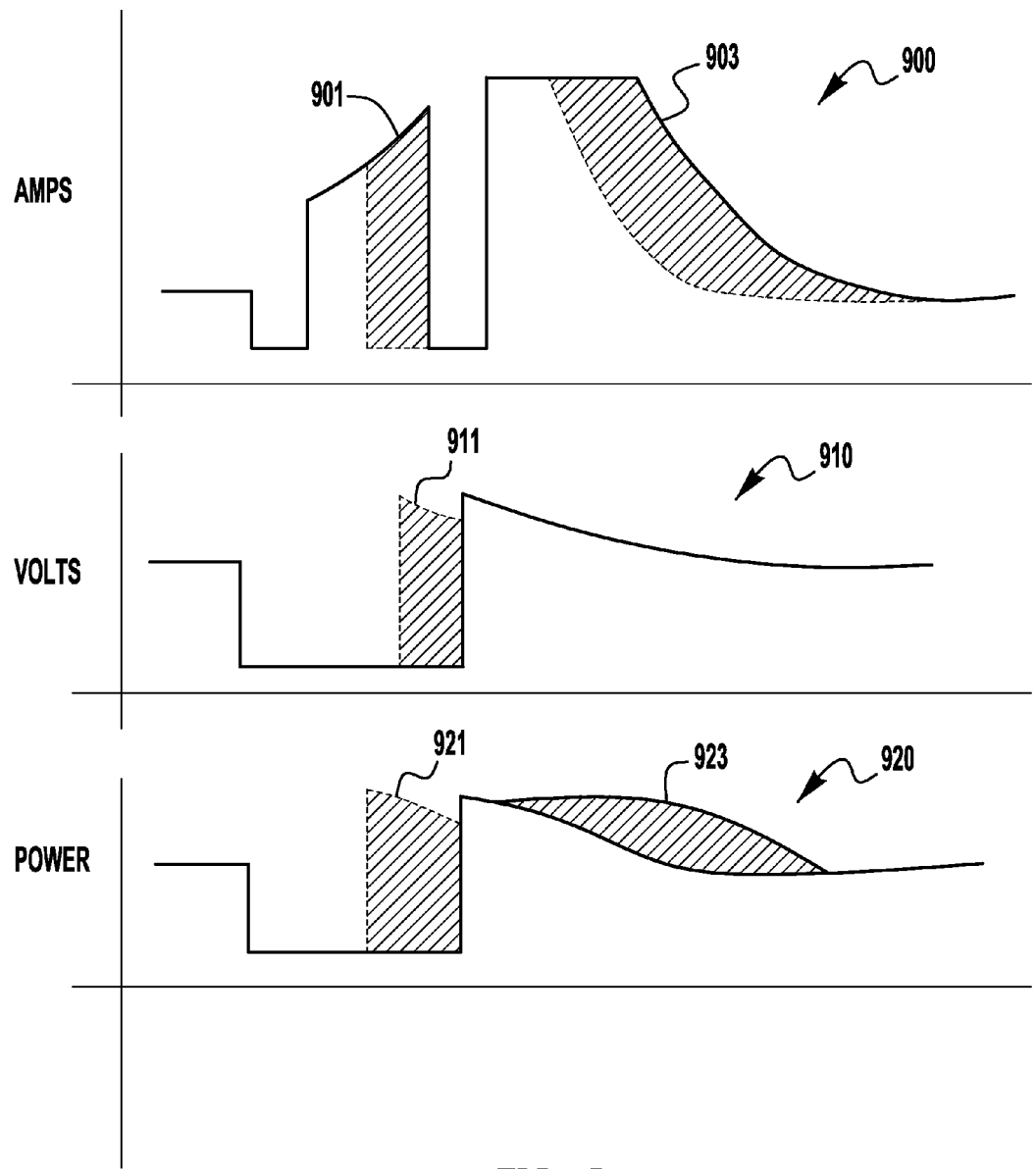
FIG. 9 illustrates a diagrammatical representation of an additional welding current, voltage and power waveform demonstrating implementation of an additional exemplary embodiment of the present invention.

FIGS. 8 and 9 depict other types of welding waveforms that can be used with exemplary embodiments of the present invention. FIG. 8 generally depicts a short arc welding waveform in which a short circuit has occurred. As shown in the power waveform 820, a loss of power 823 is experienced during the short circuit event. This loss of power is detected and accumulated—in accordance with the various embodiments discussed above—and the current waveform 800 is modified to add additional current (and thus power) back into the welding operation. (Waveform 810 is the voltage waveform). Specifically, as shown the current waveform 800 is modified such that additional current 801 is added after the peak 803. This additional current 801 causes the overall power to be increased, thus resulting in additional power 821 being added to the power waveform 820. It is noted that unlike some of the embodiments discussed above, the additional power 821 added to the power waveform 820 after the shorting event has occurred and prior to the initiation of the next welding pulse 805. In some of the embodiments discussed previously the lost power is added to the following pulse or pulses after the shorting event has occurred and been cleared. In this depicted embodiment the lost power is added to the same welding pulse in which the shorting event has occurred.

FIG. 9 depicts an exemplary embodiment of the present invention as used in a welding waveform which is using a surface tension transfer (STT) methodology—which is generally known, and as such will not be discussed in detail herein. Depicted are the current waveform 900, voltage waveform 910 and the power waveform 920. During welding an extending short circuit event occurs resulting the consumable maintaining contact with the workpiece longer than desired. This extended time results in additional current 901 being input, but also results in a loss of voltage 911 and, therefore, power 921. This loss of power is detected and accumulated consistent with any of the discussions above and the current waveform 900 is modified 903 to add additional current. This additional current adds power 923 back into the waveform and thus aids in stabilizing the operation as described above. Again, like FIG. 8, this embodiment adds the additional current/power within the same welding cycle and does not wait until a following cycle or cycles to add the lost power. Of course, in other embodiments the lost power can be added to following pulses or cycles (typically separated from the shorting event by at least one current background period). In fact, in some exemplary embodiments, the lost power can be distributed over a plurality of pulses/cycles, where one of the pulses/cycles is the pulse/cycle during which the power loss event has occurred—as shown in FIG. 9, for example.

It is noted that although the embodiments described herein and discussed above are directed to embodiments where power is lost during a welding operation (e.g., short circuit event), embodiments of the present invention can also be used to take power out of the welding process after power addition events occur during welding. That is, embodiments of the present invention recognize that power can also be added to a welding operation during arc flares, and embodiments of the present invention can use the control methodology herein to subtract power from subsequent pulse(s) to stabilize the power input into the welding operation. Because the method of control for such welding operations in consistent with the descriptions above (except that power would be removed the welding waveform) such control methodology need not be repeated here.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A system, comprising:
a power supply which receives an input signal and provides an output waveform to an electrode, where said output waveform generates an arc between said electrode and at least one workpiece, where said output waveform has a desired output power profile, said power supply comprising:
an output power circuit which determines an output power of said output waveform;
a power differential calculator which determines a difference in energy input to said at least one workpiece based on a difference between said determined output power and said desired output power profile; and
a waveform generator which changes a power output of said output waveform based on said determined difference in energy input to compensate for at least a portion of said difference in energy input to said at least one workpiece.

2. The system of claim 1, wherein said power supply detects each one of an output voltage and output current to determine said output power of said output waveform, and wherein said waveform generator modifies at least one of a current or voltage of said output signal.

3. The system of claim 1, wherein said difference between said determined output power and said desired output power profile is due to a power loss event.

4. The system of claim 1, wherein said desired output power profile has a plurality of pulses and said waveform generator changes said power output of at least one of said pulses after said difference in energy input is determined.

5. The system of claim 1, wherein said power output of said output signal is changed such that said output signal compensates for all of said determined difference in energy input between said desired output power profile and said determined output power.

6. The system of claim 1, wherein said desired output power profile has a plurality of pulses and said waveform generator changes said power output of a plurality of said pulses after said difference in energy input is determined.

7. The system of claim 1, wherein said power output of said output signal is changed only when a detected voltage between said workpiece and said electrode drops below a threshold value.

8. The system of claim 1, wherein said difference in energy input is determined only when a detected voltage between said workpiece and said electrode drops below a threshold value.

9. The system of claim 1, wherein said power output of said output signal is changed such that said output signal compensates for only a portion of said determined difference in energy input.

10. The system of claim 1, wherein said power output of said output signal is changed such that said output signal compensates for 75 to 90% of said determined difference in energy.

11. The system of claim 1, wherein said portion is determined based on said determined difference in energy input.

12. The system of claim 1, wherein at least one of said power differential calculator and said waveform generator uses a factor to determine said change in said power output of said output signal.

13. The system of claim 12, wherein said factor is determined based on said determined difference in energy input.

14. The system of claim 12, wherein said factor has a first value when said determined difference in energy input is in a first range and a second value when said determined difference in energy input is in a second range.

15. The system of claim 1, wherein at least one of said power differential calculator and said waveform generator determines said difference in energy input over a duration of said output signal.

16. The system of claim 1, wherein said waveform generator utilizes an accumulated power difference between said determined output power and said desired output power profile for said changes of said power output.

17. The system of claim 1, wherein said determined difference in energy input is due to a short circuit event between said electrode and said workpiece.

18. A system, comprising:
a power supply which receives an input signal and provides an output waveform to an electrode, where said output waveform generates an arc between said electrode and at least one workpiece, where said output waveform has a desired output power profile, said power supply comprising:
an output power circuit which determines an output power of said output waveform;
a power differential calculator which determines a difference in energy input to said at least one workpiece based on a difference between said determined output power and said desired output power profile, where said difference in energy input results from a short circuit condition between said electrode and said at least one workpiece; and
a waveform generator which increases a power output of said output waveform based on said determined difference in energy input to compensate for at least a portion of said difference in energy input to said at least one workpiece.

19. A method, comprising:
providing an arc generation waveform to an electrode, where said arc generation waveform generates an arc between said electrode and at least one workpiece, where said arc generation waveform has a desired output power profile;
determining an output power of said arc generation waveform;
determining a difference in energy input to said at least one workpiece based on a difference between said determined output power and said desired output power profile; and
changing a power output of said arc generation signal based on said determined difference in energy input to compensate for at least a portion of said difference in energy input to said at least one workpiece.

* * * * *